Patented July 29, 1941

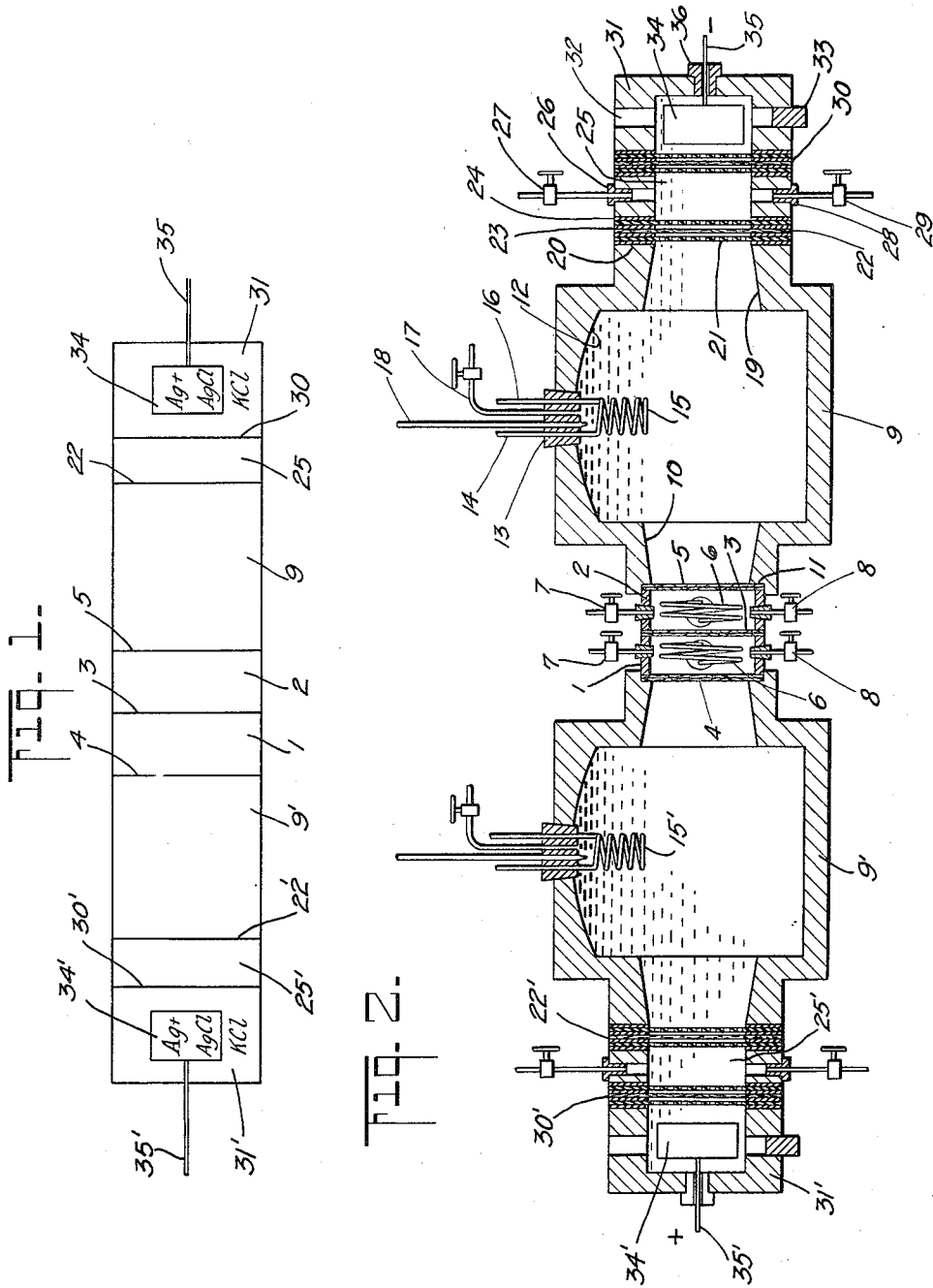

2,251,083

UNITED STATES PATENT OFFICE 2,251,083

METHOD OF AND APPARATUS FOR SEPARATING CRYSTALLOIDS FROM ACCOMPANYING SUBSTANCES

Axel Hugo Teodor Theorell, Stockholm, Sweden

Application September 22, 1937, Serial No. 165,061
In Germany September 24, 1936

13 Claims. (Cl. 204—180)

The present invention relates to the purification and separation of crystalloids from mixtures containing the same and more particularly to a method and apparatus for accomplishing this purpose.

This application is closely related to my copending application Serial No. 131,907, filed March 19, 1937, entitled "Method and means for the purification and separation of colloids from contaminating matter." In said application I have described a cell for cataphoresis having two or more compartments formed by membranes having different permeabilities towards colloids. Conducting solutions are provided and constitute means for causing a flow of current from the electrode chambers and through the colloidal solution. Said conducting solutions are maintained at a substantially constant pH of a value which is preferably the optimum for migration of the desired colloid.

The invention described and claimed herein is based upon the further discovery that not only may colloids be isolated by the cataphoretic method of my pending application, but also that crystalloids, i. e. compounds of relatively low molecular weight may be separated from each other or from colloids or a crystalloid from a mixture containing colloids and other crystalloids.

In practising my invention, the solution containing the crystalloid to be purified is brought to the proper pH and the conductivity is measured. There is prepared a buffer solution of approximately the same pH and conductivity such, for example, as solutions of acetates in acetic acid, phosphates, borates in sodium hydroxide solution and others. The buffer solution is filled into the cataphoretic apparatus, with the solution to be purified filling a compartment having a permeable membrane. On causing the electric current to flow, the desired crystalloid passes through the membrane into the adjacent compartment containing buffer solution. Usually said buffer solution is caused to flow more or less continuously through the apparatus to carry away the purified crystalloid, which is then recovered from the solution.

In the accompanying drawing, constituting a part hereof and in which like reference characters indicate like parts:

Fig. 1 is a diagrammatic view showing the arrangement of the several compartments and diaphragms of the cell; and Fig. 2 is a vertical, longitudinal, cross-sectional view of the complete apparatus, some parts being shown in elevation.

There is provided compartments 1 and 2, circular in shape, and say 4 centimeters high by 10.5 centimeters in diameter. Clamped between the same is a diaphragm or permeable membrane 3, consisting of two sheets of filter paper the edges of which have been treated with Vaseline or the like in order to form a perfect seal with the edges of compartments 1 and 2. On the outer sides of said compartments are similar filter paper membranes 4 and 5. Each of the compartments 1 and 2 is provided with a cooling coil 6. In the top of each of said compartments is a plug having an inlet closed by stop cock 7. A similar plug at the bottom thereof is provided with an outlet fitted with a stop cock 8.

Adjacent to the compartment 2 is a chamber 9 having a beveled portion 10 rectangular in shape and having a shoulder 11 in order to provide a close fit with compartment 2. The top 12 of chamber 9 is formed as an arch having an opening at the apex thereof closed by stopper 13 of rubber or any suitable material. Through said stopper is an inlet tube 14 for cooling coil 15 and also an exit tube 16, whereby cooling fluid may freely flow through the coil. An inlet pipe 17 fitted with a stop cock is also provided in the top of chamber 9. If desired, a thermometer 18 may extend through the stopper 13.

The outer side of chamber 9 is provided with a beveled portion 19 similar to portion 10 having a rubber ring or washer 20 fitted to the edge thereof. Adjacent to said washer is a perforated rubber disk 21 about 2 mm. thick with openings therein about 7 mm. in diameter. Adjacent thereto is a membrane 22 of parchment or the like having the edges thereof treated with Vaseline or similar material whereby a water tight connection may be obtained. Alongside said parchment is a rubber disk 23 similar to disk 21 and washer 24 similar to washer 20.

Adjacent thereto is chamber 25 provided with an opening at the top having a plug 26 therein and a tube 27 having a stop cock passing through said plug. Similarly, at the bottom thereof is an opening closed by plug 28 and fitted with a tube 29 provided with a stop cock. Adjacent thereto is a parchment membrane 30 in an assembly of rubber disks and washers as previously described.

The assembly is completed by an electrode chamber 31 having an opening 32 at the top thereof and a similar opening at the bottom closed by plug 33. Within said chamber is an electrode 34 which may consist of three strips of silver, each of which is 100·4·0.3 centimeters, rolled spirally and riveted or otherwise secured to a rod 35 passing through insulator 36.

As shown more particularly in Fig. 2, the left hand side of the apparatus is identical with the right hand side above described and comprises briefly a chamber 9', similar to chamber 9, and so on. The several sets of diaphragms and their component parts may be linked together and to the remainder of the apparatus by bolts or the like (not shown). Preferably, the chambers 9 and 9', 25 and 25' and 31 and 31' are made of teakwood suitably lacquered. However, other materials of construction are suitable for the purpose.

Not only is the above described apparatus suitable for carrying out the present process, but also the apparatus described in the aforesaid application for patent. However, a necessary difference lies in the fact that in the separation of crystalloids, there is introduced into the compartment into which the crystalloid migrates, means for continual emptying thereof during the cataphoresis.

In the apparatus shown in Fig. 2, a voltage of 200 has been found to give good results, but higher voltages of D. C. may be applied. The higher the voltage the more rapid is the cataphoresis. The upper limit of voltage is determined by the evolution of heat, and particularly by the heat conductivity of the cooling means. The limits are generally between the absence of any effect on the substance to be purified on the one hand, and the heating of the solution to such an extent by the high voltage as to prevent filtration, on the other hand. As a practical matter, in the apparatus of Fig. 2 at least 600 watts should be applied, assuming that the cooling coils are of thin glass and water at ordinary temperatures is used, for good results. Still better results are obtainable when using refrigerated water or greater volume or both.

In order to utilize the apparatus for the desired purpose, the electrodes 35 and 35' are first subjected to an anodic treatment in a saturated solution of KCl at 0.5 ampere for about 100 hours in order to form a chloride surface on the electrodes. The electrode chambers 31 and 31' are filled with a substantially saturated KCl solution. The intermediate chambers 9 and 9' and anode and cathode chambers 25 and 25' are filled completely with the buffer solution. By reason of the beveled surfaces 10 and 19 and the arched roof 12, air that might become trapped therein is allowed to escape. The buffer solution is caused to flow into compartment 2 so as to cause a bulging of membranes 3 and 4 slightly to the left. The stop cocks 7 and 8 therein are then closed. Then stop cocks 7 and 8 in compartment 1 may be opened and the solution to be purified allowed to flow into said compartment simultaneously with the out-flow of the buffer solution and the stop cocks may then be closed. In the alternative, compartment 1 may be first fully emptied and then the solution to be purified filled into the same.

Buffer solution is allowed to flow through compartment 2 at a suitable rate by manipulation of the stop cocks, as, for example, at the rate of two drops per second. Preferably, it is caused to flow through the compartment 2 from top to bottom as this usually gives more effective results. The rate of flow should be sufficient so that no substantial amount of crystalloid passes into intermediate chamber 9. To accomplish this, a rate of flow of from 2 to 3 liters per hour has been found suitable.

Suitable voltage is supplied at the electrodes 35 and 35' as, for example, 200 volts D. C. and the migration of the crystalloid takes place into compartment 2. The buffer solution containing a crystalloid may, after it leaves the apparatus, be treated for the isolation of the crystalloid.

Similarly, a plurality of crystalloids may be separated from each other by the use of a series of permeable membranes whereby different rates of migration of the crystalloids may be taken advantage of and each crystalloid may be isolated in a separate compartment. To accomplish this, a series of compartments 2 may be provided.

The separation of the crystalloid from the buffer solution is usually not difficult. Low molecular weight substances may be readily separated from buffer solutions by treatment with organic solvents. Such buffer solutions as barium acetate-acetic acid mixtures may be treated with sulphuric acid to precipitate out the barium and then distilled to remove the acetic acid.

Under the above described conditions the cataphoresis proceeds without any appreciable alteration in the pH or conductivity throughout the entire operation. The solution in the cataphoretic cell is continually mixed and no appreciable stratification takes place; if there should be stratification, the pH and the conductivity in the several layers are substantially unchanged, in contrast to the conditions in electro-dialysis. Under these circumstances, the migration of the substance to be purified is proportional to the time. The following equation may be used to calculate the time of cataphoresis and the ionic mobility:

$$\frac{dc}{dt} = k(V \cdot c - x) \quad (1)$$

$dc$ designates the change in concentration in the time element $dt$; $k$ is a constant, $V$ the volume of the solution in the cataphoretic cell, $c$ the concentration of the substance to be purified, and $x$ the amounts thereof removed when the time, $t, = 0$.

The integral form of (1) is:

$$k = \frac{1}{t} \ln \frac{V \cdot c}{V \cdot c - x} \quad (2)$$

When $t = 0$, $x = 0$ and therefore $$\frac{dc}{dt} = k \cdot V \cdot c \quad (3)$$

The speed of migration, $h$ in cm./sec., is:

$$h = \frac{k \cdot V \cdot c}{V \cdot c} \cdot \frac{V}{q} = \frac{K \cdot V}{q} \quad (4)$$

where $q$ is the cross-section of the cataphoretic cell, expressed in square centimeters.

By the substitution of this value of $h$ in the equation for the ionic mobility $u$, we obtain:

$$u = \frac{k \cdot V \cdot \kappa}{i} \quad (5)$$

In this equation $\kappa$ stands for the conductivity, and $i$ designates the electrical current strength.

By means of the Equations 1–5, when the ionic mobility is known, one can calculate, for instance, at a given current and conductivity, the time required for obtaining a 90% yield.

The following examples describe the isolation of the blood building principle of liver, a crystalloidal substance.

Example I 377 cc. of a solution of an anti-anemia active liver preparation, containing 264 mg. nitrogen was subjected to cataphoresis with the aid of a phosphate buffer solution. The pH of both solutions at the beginning was 6.5 and the conductivity was $0.93 \times 10^{-3}$, the temperature during the operation was about 20° C., the current was 0.61 amp. To obtain this current a voltage of 400 was applied. The substance to be purified migrated to the cathode. The flow through the cathode compartment was at the rate of 4 liters per hour of buffer solution. Four portions, each representing 30 minutes of flow each, were collected, and after 2 hours the operation was ended.

The pH in the anode chamber was then 6.54, the conductivity at 20° C. was $0.91 \times 10^{-3}$, both practically unchanged. The first 30 minute portion contained 22.5 mg. nitrogen, the second 14.8 mg. nitrogen, the third 8.5 mg. and the fourth 5.1 mg. Portions 1 and 2 contained about two-thirds and portions 3 and 4 about two-ninths of the total substance E, and one-ninth remained in the anode compartment; therefore the recovery in two hours was about 89%. If the cataphoresis is conducted for one hour longer, then only about 4% remains in the anode compartment, the recovery being about 96%. Of the original 264 mg. nitrogen, altogether 50.9 mg.=19.3% was found in the cathode portions. The purification by cataphoresis, based on nitrogen, was about five fold. About 40% of nitrogen migrated to the anode.

From the data obtained the ionic mobility of the erythropoietic substance E may be calculated $$k = \frac{1}{3600} \cdot \ln \cdot 3 = 3.06 \cdot 10^{-4} \text{ sec.}^{-1}$$

$$u = \frac{3.06 \cdot 10^{-4} \cdot 357 \cdot 0.92}{0.61} = 15.6 \cdot 10^{-5} \text{ sq. cm.}$$

per volt second at 20° C.

Example II 330 cc. of an active liver preparation obtained from 10.5 kg. of liver, contained 56.2 gr. of dry substance, having 4.74 gr. nitrogen and 5.9 gr. ash. The pH of the solution was 6.68, and the conductivity was $10.1 \times 10^{-3}$. The phosphate buffer solution had a pH of 6.68, and the conductivity was $12.7 \times 10^{-3}$. The flow of the buffer solution through the cathode compartment was at the rate of 2 liters per hour. The cataphoresis was conducted for 4 hours with a current of 3.1–3.5 amp. At the termination of the operation the pH in the anode compartment was 6.72 and the conductivity was $10.6 \times 10^{-3}$. In the anode intermediate compartment the pH was 6.72 and the conductivity $13.1 \times 10^{-3}$, while in the cathode intermediate compartment the pH was 6.72 and the conductivity $12.7 \times 10^{-3}$. Therefore, the pH and conductivity were practically unchanged.

The purified substance, after the recovery thereof from the phosphate solution, contained 6.17 gr. of dry substance and 0.721 gr. nitrogen. Based on the dry substance the purification was nine fold, based on nitrogen it was 6.6 fold. By the cataphoresis about 95% of the yellowish green coloring matter was removed.

The present process is applicable to the purification not only of liver extracts and the like, but also to other crystalloid and crystalloid and colloid containing solutions. It allows the separation of mixtures into their components, for it is unusual to find two different chemical compounds having in solution at every pH under the influence of the electric current, the same speed of migration in the same direction. One can almost always find a pH at which the desired substance is separable from the accompanying matter. An important advantage of the present process over old methods is that the isolation of the several dissolved substances may be made independently of each other by the cataphoretic migration. This makes it possible to determine certain characteristics of substances independently of the often unknown purity thereof. Thereby one can obtain information relative to the nature of substance being investigated, for example, whether it is a base, an acid or amphoteric. In the latter case, one may determine the isoelectric point. These characteristics are of importance for the purification of the substances by other methods also.

What I claim is:

1. A method of purification of crystalloids to separate the same from other crystalloids and mixtures of crystalloids and colloids which comprises placing a solution containing a crystalloid to be purified in the cataphoretic compartment of a cell having a permeable membrane, interposing a buffer salt solution between said compartment and the electrodes of said cell, the pH of said solution corresponding to that necessary to cause selective migration of said crystalloid, subjecting said crystalloid containing solution to the electric current to cause migration of said crystalloid through said membrane, and maintaining the pH of the system substantially constant during said treatment.

2. A method of purification of crystalloids to separate the same from other crystalloids and mixtures of crystalloids and colloids which comprises placing a solution containing a crystalloid to be purified in the cataphoretic compartment of a cell having a permeable membrane, interposing a buffer salt solution between said compartment and the electrodes of said cell, the pH of said solution corresponding to that necessary to cause selective migration of said crystalloid, subjecting said crystalloid containing solution to the electric current to cause migration of said crystalloid through said membrane, maintaining the pH of the system substantially constant during said treatment, and removing the solution containing the purified crystalloid substantially continuously.

3. A method of purification of crystalloids to separate the same from other crystalloids and mixtures of crystalloids and colloids which comprises placing a solution containing a crystalloid to be purified in the cataphoretic compartment of a cell having a permeable membrane, interposing a buffer salt solution between said compartment and the electrodes of said cell, the pH of said solution corresponding to that necessary to cause selective migration of said crystalloid, subjecting said crystalloid containing solution to the electric current to cause migration of said crystalloid through said membrane, maintaining the pH of the system substantially constant during said treatment, and removing the solution containing the purified crystalloid substantially continuously by causing a flow of buffer solution adjacent to said membrane.

4. A method of purification of crystalloids to separate the same from other crystalloids and mixtures of crystalloids and colloids which comprises placing a solution containing the crystalloidal blood building principle of liver in the cataphoretic compartment of a cell having a permeable membrane, interposing a buffer salt solution between said compartment and the electrodes of said cell, the pH of said solution corresponding to that necessary to cause selective migration of said crystalloid, subjecting said crystalloid containing solution to the electric current to cause migration of said crystalloid through said membrane, and maintaining the pH of the system substantially constant during said treatment.

5. A method of purification of crystalloids to separate the same from other crystalloids and mixtures of crystalloids and colloids which comprises placing a solution containing the crystalloidal blood building principle of liver in the cataphoretic compartment of a cell having a permeable membrane, interposing a buffer salt solution between said compartment and the electrodes of said cell, the pH of said solution corresponding to that necessary to cause selective migration of said crystalloid, subjecting said crystalloid containing solution to the electric current to cause migration of said crystalloid through said membrane, and maintaining the pH of the system substantially constant during said treatment at a value of about 6.5–6.75.

6. A method of purification of crystalloids to separate the same from other crystalloids and mixtures of crystalloids and colloids which comprises placing a solution containing a crystalloid to be purified in the cataphoretic compartment of a cell having a permeable membrane of filter paper, interposing a buffer salt solution between said compartment and the electrodes of said cell, the pH of said solution corresponding to that necessary to cause selective migration of said crystalloid, subjecting said crystalloid containing solution to the electric current to cause migration of said crystalloid through said membrane, and maintaining the pH of the system substantially constant during said treatment.

7. A method of purification of crystalloids to separate the same from other crystalloids and mixtures of crystalloids and colloids which comprises placing a solution containing a crystalloid to be purified in the cataphoretic compartment of a cell having a permeable membrane, interposing a buffer salt solution between said compartment and the electrodes of said cell, the pH of said solution corresponding to that necessary to cause selective migration of said crystalloid, subjecting said crystalloid containing solution to the electric current to cause migration of said crystalloid through said membrane, cooling said solutions and maintaining the pH of the system substantially constant during said treatment.

8. An apparatus for cataphoresis comprising a cataphoretic cell, electrode chambers communicating therewith, at least one fully permeable membrane in said cell defining at least one cataphoretic compartment adapted to contain a solution of a substance to be purified, and a buffer salt solution in said electrode chambers.

9. An apparatus for cataphoresis comprising a cataphoretic cell, electrode chambers communicating therewith, at least one fully permeable membrane of filter paper in said cell defining at least one cataphoretic compartment adapted to contain a solution of a substance to be purified, and a buffer salt solution in said electrode chambers.

10. An apparatus for cataphoresis comprising a cataphoretic cell, electrode chambers communicating therewith, at least one fully permeable membrane in said cell defining at least one cataphoretic compartment adapted to contain a solution of a substance to be purified, and a buffer salt solution in said electrode chambers and means for cooling said solutions.

11. An apparatus for cataphoresis comprising a cataphoretic cell, electrode chambers communicating therewith, at least one fully permeable membrane in said cell defining at least one cataphoretic compartment adapted to contain a solution of a substance to be purified, a buffer salt solution in said electrode chambers and cooling coils in the cataphoretic compartment and electrode chambers.

12. An apparatus for cataphoresis comprising a cataphoretic cell, electrode chambers communicating therewith, at least one fully permeable membrane in said cell defining at least one cataphoretic compartment adapted to contain a solution of a substance to be purified, a buffer salt solution in said electrode chambers and means for causing a continuous flow of buffer solution adjacent said membrane.

13. A method of purification of crystalloids to separate the same from other crystalloids and mixtures of crystalloids and colloids which comprises placing a solution containing a crystalloid to be purified in the cataphoretic compartment of a cell having a permeable membrane, interposing a buffer solution between said compartment and the electrodes of said cell, the pH of said solution corresponding to that necessary to cause selective migration of said crystalloid, the pH and conductivity of said buffer solution being approximately the same as that of said solution to be purified, subjecting said crystalloid containing solution to the direct electric current to cause migration of said crystalloid through said membrane, and maintaining the pH of the system substantially constant during said treatment.

AXEL HUGO TEODOR THEORELL.